United States Patent
Lee et al.

(10) Patent No.: US 9,182,790 B2
(45) Date of Patent: Nov. 10, 2015

(54) PHASE-LOCKED PIVOT ASSEMBLY

(71) Applicant: SHIN ZU SHING CO., LTD., New Taipei (TW)

(72) Inventors: Chung-Yu Lee, New Taipei (TW); Chun-Chang Chen, New Taipei (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 98 days.

(21) Appl. No.: 14/053,776

(22) Filed: Oct. 15, 2013

(65) Prior Publication Data

US 2015/0101148 A1  Apr. 16, 2015

(51) Int. Cl.
*G06F 1/16* (2006.01)

(52) U.S. Cl.
CPC ............ *G06F 1/1681* (2013.01); *G06F 1/1616* (2013.01); *Y10T 16/541* (2015.01)

(58) Field of Classification Search
CPC ... Y10T 16/54; Y10T 16/5403; Y10T 16/541; Y10T 16/547; E05D 3/06; E05D 3/12; E05D 3/122; E05D 11/1007; E05Y 2900/606; G06F 1/1616; G06F 1/1618; G06F 1/1681; H04M 1/0216; H04M 1/022
USPC ............... 16/319, 337, 354, 366; 361/679.27; 455/575.3; 379/433.13
See application file for complete search history.

(56) References Cited

U.S. PATENT DOCUMENTS

| | | | | |
|---|---|---|---|---|
| 8,474,101 | B2 * | 7/2013 | Wang et al. | 16/366 |
| 8,713,757 | B2 * | 5/2014 | Chen et al. | 16/354 |
| 2007/0054710 | A1 | 3/2007 | Pan | |
| 2008/0109995 | A1 * | 5/2008 | Kuwajima et al. | 16/354 |
| 2009/0007372 | A1 * | 1/2009 | Ueyama et al. | 16/50 |
| 2009/0013500 | A1 * | 1/2009 | Ueyama et al. | 16/354 |
| 2009/0070961 | A1 * | 3/2009 | Chung et al. | 16/354 |
| 2011/0157780 | A1 * | 6/2011 | Wang et al. | 361/679.01 |
| 2011/0271486 | A1 * | 11/2011 | Wang et al. | 16/319 |
| 2011/0289728 | A1 * | 12/2011 | Wang et al. | 16/337 |
| 2012/0096678 | A1 * | 4/2012 | Zhang et al. | 16/302 |
| 2013/0187525 | A1 * | 7/2013 | Chuang | 312/326 |
| 2013/0322004 | A1 * | 12/2013 | Park | 361/679.27 |

FOREIGN PATENT DOCUMENTS

| | | |
|---|---|---|
| CN | 202484069 U | 10/2012 |
| TW | M428641 U | 5/2012 |
| TW | M452593 U | 5/2013 |
| TW | I398209 B | 6/2013 |

* cited by examiner

*Primary Examiner* — William Miller
(74) *Attorney, Agent, or Firm* — Alan D. Kamrath; Kamrath IP Lawfirm, P.A.

(57) ABSTRACT

A phase-locked pivot assembly includes a support component. A first shaft and a second shaft pivot relative to the support component. A first annular body is configured to rotate with the first shaft. The first annular body includes a first outer annular surface and a first sunken arc portion. A second annular body is configured to rotate with the second shaft and corresponds to the first annular body. The second annular body includes a second outer annular surface and a second sunken arc portion. The first sunken arc portion and the second outer annular surface are matched and selectively contact each other to lock the first shaft. The second sunken arc portion and the first outer annular surface are matched and selectively contact each other to lock the second shaft.

9 Claims, 8 Drawing Sheets

PHASE-LOCKED PIVOT ASSEMBLY

BACKGROUND OF THE INVENTION

1. Field of the Invention

The present invention relates to a pivot assembly and, more particularly, to a phase-locked pivot assembly.

2. Description of the Prior Art

With advanced technology, the touch panel is disposed on the notebook computer, the tablet computer and the smart phone widespread. The notebook computer with the touch panel can be switched as the tablet computer mode. The notebook computer includes a first casing and a second casing. The first casing is an upper cover whereon the touch panel is disposed, and the second casing is a base whereon electronic components, the battery and the keyboard are disposed. The first casing can rotate to be reverse to the second casing to switch the notebook computer into the tablet computer mode. In the meantime, the screen of the first casing faces outward. The structural relation of the first casing and the second casing includes the following embodiments.

One of the embodiments disposes a first pivot portion on a middle of a lateral side of the first casing, and further disposes a second pivot portion on a middle of a lateral side of the second casing. The first pivot portion corresponds to the second pivot portion. The first casing can rotate relative to the second casing via an assembly of the first pivot portion and the second pivot portion, and an angle of the second casing relative to the first casing can be adjusted accordingly. The first casing can rotate relative to the second casing to 180 degrees, the back of the first casing contacts against the second casing, the screen of the first casing faces outward, and the notebook computer can be utilized as the tablet computer for handheld touch operation. However, the conventional pivot mechanism has drawbacks of weak strength and short service life.

Another embodiment disposes a biaxial pivot assembly between the first casing and the second casing. The biaxial pivot assembly includes a first shaft and a second shaft, which are respectively connected to the first casing and the second casing. The first casing can rotate relative to the second casing within a range of 0~360 degrees. As the first casing rotates relative to the second casing to 360 degrees, the back of the first casing contacts against the second casing, and the screen on the first casing faces outward. The conventional biaxial pivot assembly has drawbacks of inconvenient operation and sluggish rotation due to asynchronous connection between the first shaft and the second shaft.

SUMMARY OF THE INVENTION

The present invention provides a phase-locked pivot assembly to lock the first shaft and the second shaft step by step for providing fluent rotation and convenient operation.

According to the invention, a phase-locked pivot assembly includes a support component, a first shaft, a second shaft, a first annular body and a second annular body. The support component includes a first contacting portion and a second contacting portion. The first shaft pivots relative to the support component. The first shaft and the second shaft pivot relative to the support component respectively. The first annular body is configured to rotate together with the first shaft. The first annular body includes a first outer annular surface and a first sunken arc portion. The second annular body is configured to rotate together with the second shaft and corresponds to the first annular body. The second annular body includes a second outer annular surface and a second sunken arc portion. The first sunken arc portion is matched with the second outer annular surface, and the first sunken arc portion and the second outer annular surface selectively contact each other to lock the first shaft. The second sunken arc portion is matched with the first outer annular surface, and the second sunken arc portion and the first outer annular surface selectively contact each other to lock the second shaft.

According to an embodiment of the invention, the phase-locked pivot assembly further includes a first gear and a second gear. The first gear is disposed on the first shaft in a surrounding manner. The second gear is disposed on the first annular body and engaged with the first gear. An axial direction of the second gear aligns with an axial direction of the first annular body.

According to the embodiment of the invention, a tooth amount of the first gear is greater than a tooth amount of the second gear.

According to the embodiment of the invention, a tooth ratio of the first gear to the second gear is one point five.

According to the embodiment of the invention, the first annular body and the second gear pivot relative to the support component, and are located between the first shaft and the second shaft.

According to the embodiment of the invention, the second annular body is disposed on the second shaft in a surrounding manner.

According to the embodiment of the invention, the phase-locked pivot assembly further includes a third annular body disposed on the first shaft in a surrounding manner. The third annular body includes a third outer annular surface, and the third outer annular surface selectively contacts the first outer annular surface.

According to the embodiment of the invention, the support component includes a first supporting plate and a second supporting plate. The first annular body and the second annular body are located between the first supporting plate and the second supporting plate.

According to the embodiment of the invention, the support component further comprises a first contacting portion and a second contacting portion. The first shaft further comprises a first constraining portion corresponding to the first contacting portion. The second shaft further comprises a second constraining portion corresponding to the second contacting portion.

According to the embodiment of the invention, the first constraining component is a protrusion protruding from the first shaft substantially along a radial direction of the first shaft. The second constraining component is a protrusion protruding from the second shaft substantially along a radial direction of the second shaft.

According to the embodiment of the invention, the first contacting portion and the second contacting portion substantially are protrusions protruding from the support component.

The phase-locked pivot assembly of the present invention can lock the first shaft and the second shaft step by step. Comparing to the prior art, the present invention provides the phase-locked pivot assembly with advantages of fluent rotation, convenient operation and durable quality.

These and other objectives of the present invention will no doubt become obvious to those of ordinary skill in the art after reading the following detailed description of the preferred embodiments that are illustrated in the various figures and drawings.

DETAILED DESCRIPTION

Figure 1:
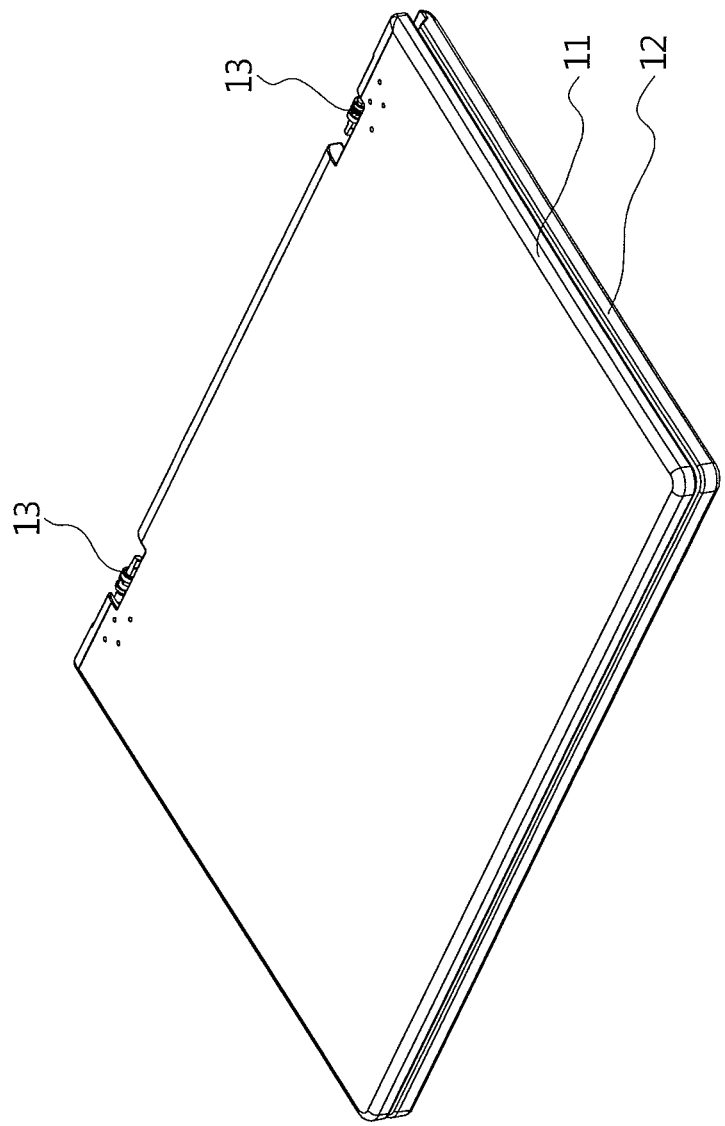
FIG. 1 is a diagram of an electronic device at a zero-degree mode according to a preferred embodiment of the present invention.

Please refer to FIG. 1. An electronic device 10 includes a first casing 11, a second casing 12 and a phase-locked pivot assembly 13. In this embodiment, the electronic device 10 can be, but is not limited to, the notebook computer. The first casing 11 is an upper cover whereon the touch panel is disposed, and the second casing 12 can be a base whereon the electronic components, the battery and the keyboard are disposed. The electronic device 10 includes two phase-locked pivot assemblies 13 disposed between the first casing 11 and the second casing 12 in symmetry.

Figure 2:
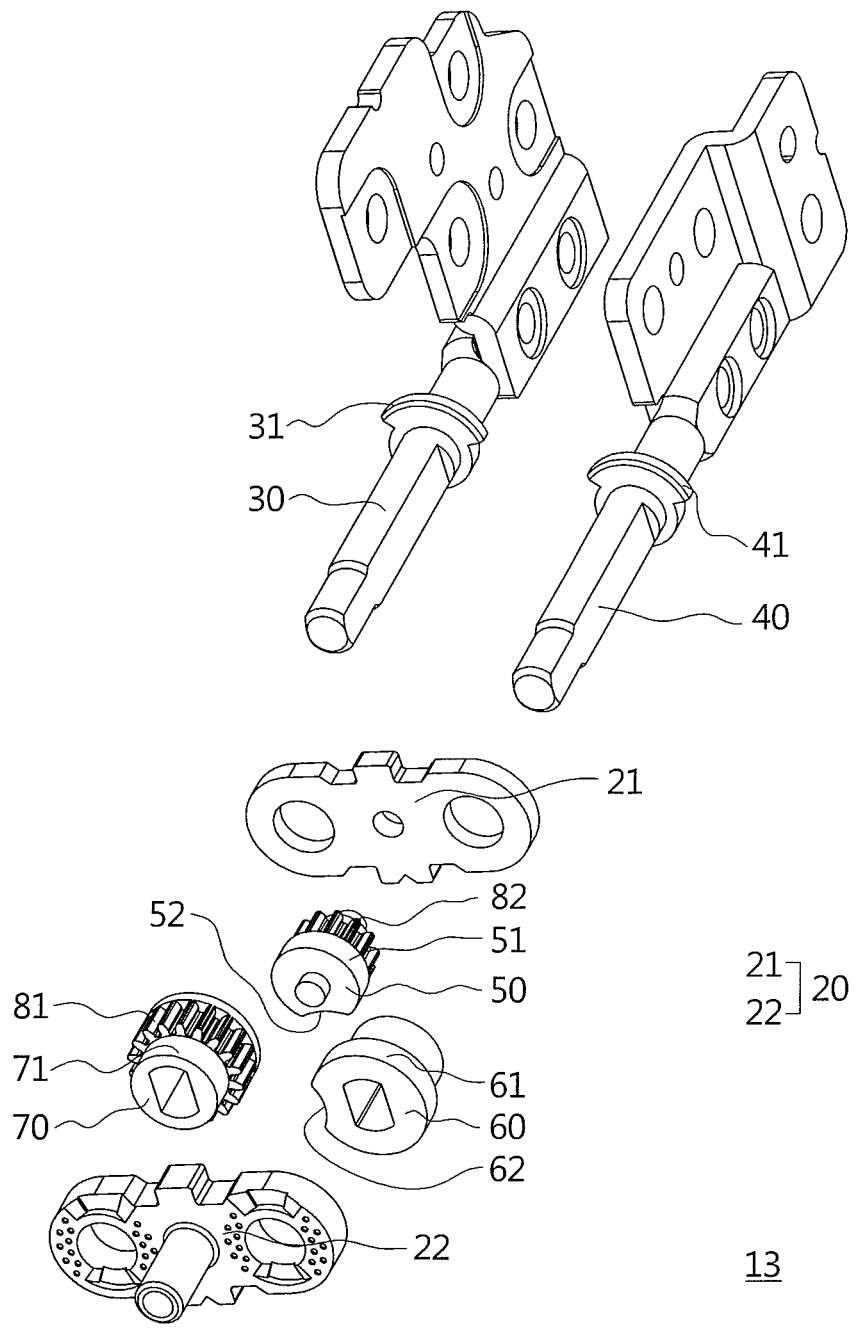
FIG. 2 is an exploded diagram of the phase-locked pivot assembly according to the embodiment of the present invention.
Figure 3:
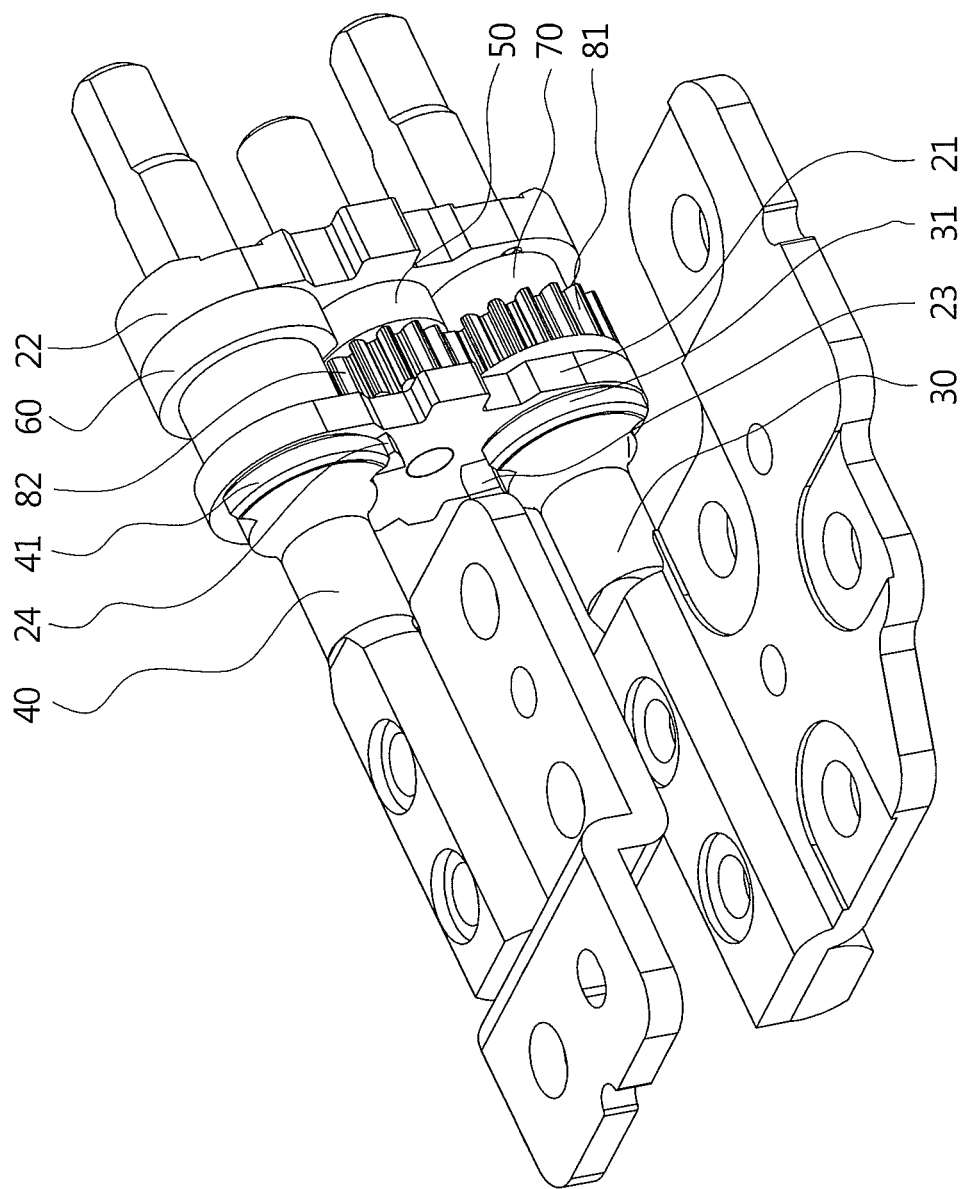
FIG. 3 is an assembly diagram of the phase-locked pivot assembly at the zero-degree mode according to the embodiment of the present invention.

Please refer to FIG. 2 and FIG. 3. FIG. 2 is an exploded diagram of the phase-locked pivot assembly 13 according to the embodiment of the present invention. FIG. 3 is an assembly diagram of the phase-locked pivot assembly 13 in another view according to the embodiment of the present invention. The phase-locked pivot assembly 13 includes a support component 20, a first shaft 30, a second shaft 40, a first annular body 50, a second annular body 60, a third annular body 70, a first gear 81 and a second gear 82. The support component 20 includes a first supporting plate 21 and a second supporting plate 22, and the first supporting plate 21 and the second supporting plate 22 are spaced from each other in parallel. A plurality of pivot holes (not labeled in figures) is formed on the first supporting plate 21 and the second supporting plate 22. The support component 20 further includes a first contacting portion 23 and a second contacting portion 24, as shown in FIG. 3. In this embodiment, the first contacting portion 23 and the second contacting portion 24 substantially are protrusions protruding from a surface of the first supporting plate 21 opposite to the second supporting plate 22.

The first shaft 30 and the second shaft 40 respectively pivot relative to the support component 20. Specifically, the first shaft 30 and the second shaft 40 rotatably pass through the corresponding pivot holes on the first supporting plate 21 and the second supporting plate 22, respectively. The first shaft 30 and the second shaft 40 are in parallel, as shown in FIG. 3. The first shaft 30 includes a first constraining portion 31, and a position of the first constraining portion 31 corresponds to a position of the first contacting portion 23. The second shaft 40 includes a second constraining portion 41, and a position of the second constraining portion 41 corresponds to a position of the second contacting portion 24. In this embodiment, the first constraining portion 31 is a protrusion protruding from the first shaft 30 substantially along a radial direction of the first shaft 30, and the second constraining portion 41 is a protrusion protruding from the second shaft 40 substantially along a radial direction of the second shaft 40. The first constraining portion 31 and the second constraining portion 41 rotate together with the first shaft 30 and the second shaft 40, respectively. Steps are formed between two ends of the first constraining portion 31 and the first shaft 30, and are further formed between two ends of the second constraining portion 41 and the second shaft 40. Two ends of the first constraining portion 31 can be alternatively blocked by the first contacting portion 23, to constrain a rotary direction and a rotary angle of the first shaft 30. Two ends of the second constraining portion 41 can be alternatively blocked by the second contacting portion 24, to constrain a rotary direction and a rotary angle of the second shaft 40.

The first annular body 50 is configured to rotate together with the first shaft 30. The first annular body 50 includes a first outer annular surface 51 and a first sunken arc portion 52. The sunken arc portion is sunk along a radial direction of the annular body. A section view of the first outer annular surface 51 is a major arc which is not a complete circle, and a section view of the first sunken arc portion 52 is a minor arc. The second annular body 60 is configured to rotate together with the second shaft 40 and corresponds to the first annular body 50. The second annular body 60 includes a second outer annular surface 61 and a second sunken arc portion 62. A section view of the second outer annular surface 61 is a major arc which is not the complete circle, and a section view of the second sunken arc portion 62 is a minor arc. The first sunken arc portion 52 and the second outer annular surface 61 are matched and selectively contact each other to lock the first shaft 30. The second sunken arc portion 62 and the first outer annular surface 51 are matched and selectively contact each other to lock the second shaft 40. The first sunken arc portion 52 and the second outer annular surface 61 have the similar curvature, and the second sunken arc portion 62 and the first outer annular surface 51 have the similar curvature. When the second outer annular surface 61 contacts against the first sunken arc portion 52, the first shaft 30 is locked without rotation. Because the second outer annular surface 61 is engaged with the first sunken arc portion 52, the first annular body 50 and the first shaft 30 do not rotate, and the second outer annular surface 61 can rotate relative to the first sunken arc portion 52 due to rotary freedom of the second shaft 40. Further, when the first outer annular surface 51 contacts against the second sunken arc portion 62, the second shaft 40 is locked without rotation. Because the first outer annular surface 51 is engaged with the second sunken arc portion 62, the second annular body 60 and the second shaft 40 do not rotate, and the first outer annular surface 51 can rotate relative to the second sunken arc portion 62 due to rotary freedom of the first shaft 30.

Figure 4:
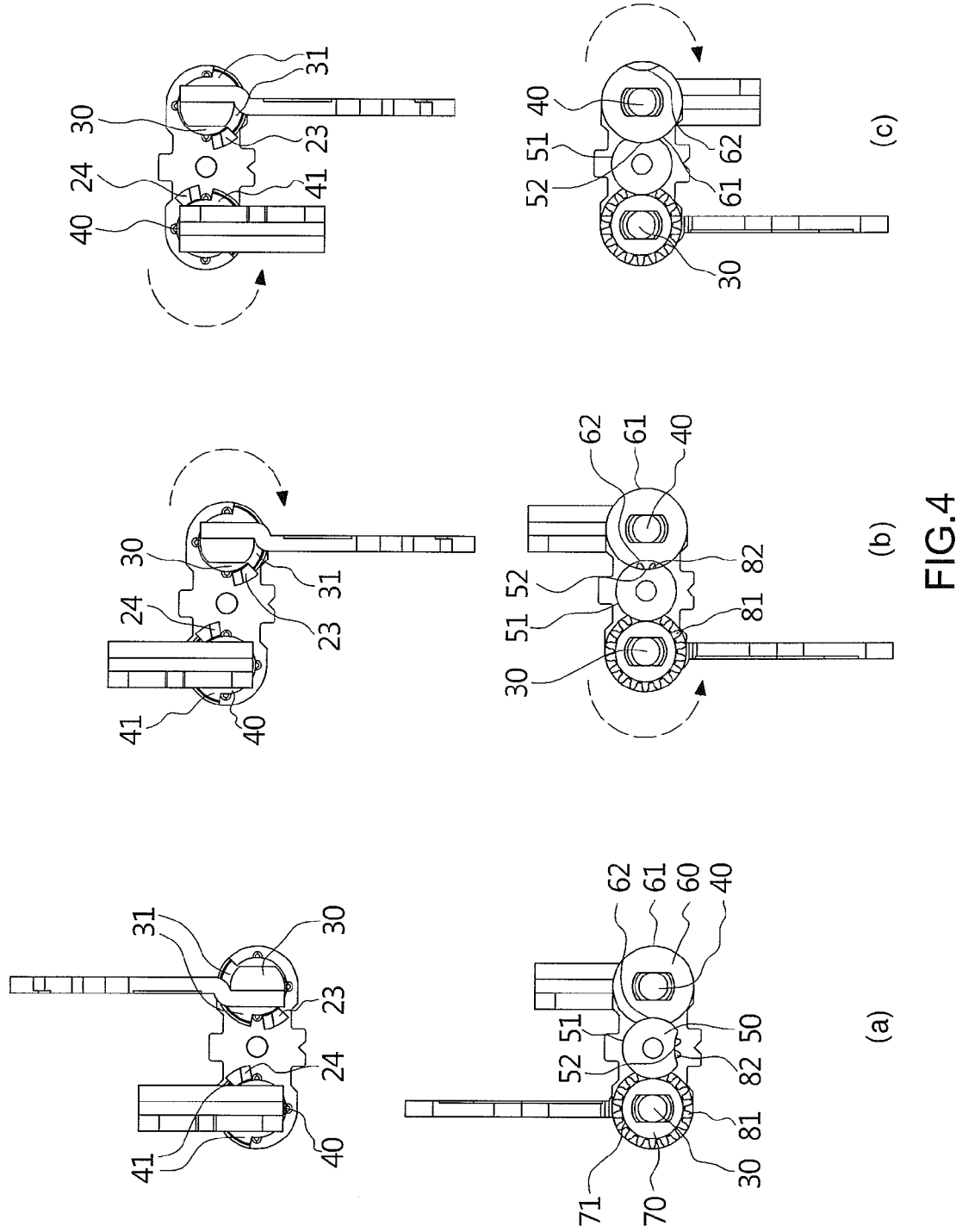
FIG. 4 is a diagram of the phase-locked pivot assembly in different operation modes according to the embodiment of the present invention.

Please refer to FIG. 2 to FIG. 4. FIG. 4 is a diagram of the phase-locked pivot assembly 13 in different operation modes according to the embodiment of the present invention. Several components of the phase-locked pivot assembly 13 are omitted herein for simplicity. In this embodiment, the second annular body 60 is disposed on the second shaft 40 in a surrounding manner, and the second annular body 60 can rotate with the second shaft 40. The first annular body 50 can rotate together with the first shaft 30 via a combination of the first gear 81 and the second gear 82. The first gear 81 is disposed on the first shaft 30 in a surrounding manner, so that the first gear 81 rotates according to rotation of the first shaft 30. The second gear 82 is disposed on the first annular body 50, and an axial direction of the second gear 82 aligns with an axial direction of the first annular body 50. The second gear 82 and the first annular body 50 are located between the first shaft 30 and the second shaft 40, and further pivot to the first supporting plate 21 and the second supporting plate 22. The first gear 81 is engaged with the second gear 82. When the first shaft 30 rotates, the first gear 81 drives the second gear 82 and the first annular body 50 to rotate. In another embodiment, the first gear and the second gear can be omitted to directly dispose the first annular body on the first shaft in the surrounding manner, and a gap between the first shaft and the second shaft can be decreased and/or radiuses of the first annular body and the second annular body can be increased, so that the first sunken arc portion can selectively contact against the second outer annular surface to lock the first shaft, and the second sunken arc portion can selectively contact against the first outer annular surface to lock the second shaft.

In this embodiment, a tooth amount of the first gear 81 is greater than a tooth amount of the second gear 82, and a tooth ratio of the first gear 81 to the second gear 82 is one point five (ratio=1.5). The second gear 82 and the first annular body 50 rotate to 270 degrees when the first gear 81 and the first shaft 30 rotate to 180 degrees. Besides, the third annular body 70 is disposed on the first shaft 30 in a surrounding manner and adjacent to the first gear 81. The third annular body 70 includes a third outer annular surface 71, which selectively contacts the first outer annular surface 51. The first outer annular surface 51 and the third outer annular surface 71 rotatably contacts each other during rotation of the first shaft 30 and the first annular body 50 except that the first sunken arc portion 52 faces the third annular body 70, to increase rotary stability. The first annular body 50, the second annular body 60 and the third annular body 70 are disposed in parallel and located between the first supporting plate 21 and the second supporting plate 22. The gear ratio of the first gear to the second gear is not limited to the value mentioned above, and depends on design demand. For example, the gear ratio is designed to conform to the situation that the first sunken arc portion does not contact the second outer annular surface when the first shaft does not rotate, and the first sunken arc portion faces the second outer annular surface to unlock the second shaft when the first shaft rotates to 180 degrees.

A detailed operating description of the phase-locked pivot assembly 13 is illustrated as follows. An angle between the first casing 11 and the second casing 12 can be zero degree, which is shown in FIG. 1. In the meanwhile, the state of the phase-locked pivot assembly 13 is shown in FIG. 3. Further, FIG. 4(a) is a top/bottom view of the said state of the phase-locked pivot assembly 13. At the time, the second sunken arc portion 62 contacts the first outer annular surface 51, and the second shaft 40 is locked because the second sunken arc portion 62 is constrained by the first outer annular surface 51. The first shaft 30 is rotatable, an end of the first constraining portion 31 is blocked by the first contacting portion 23, and the first shaft 30 only can rotate at the counterclockwise direction, which is referred by FIG. 4(a).

Figure 5:
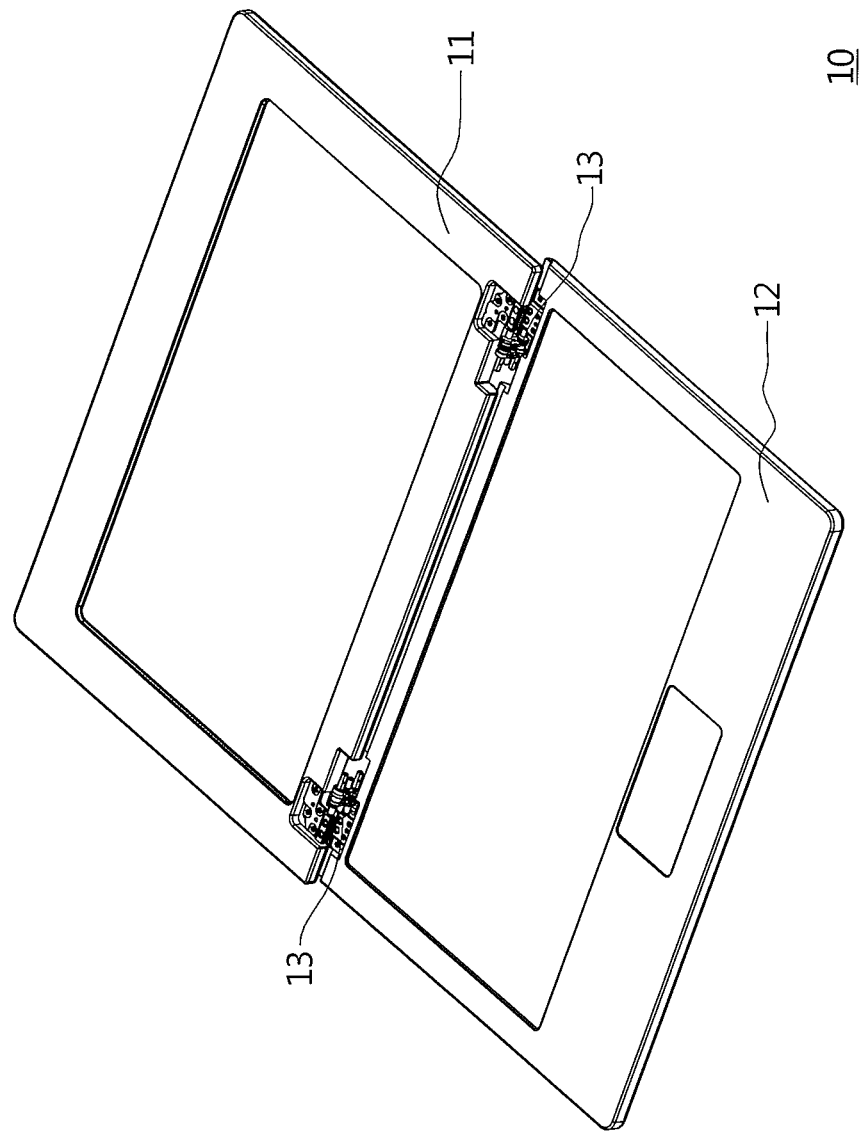
FIG. 5 is a diagram of the electronic device at a 180-degree mode according to the embodiment of the present invention.
Figure 6:
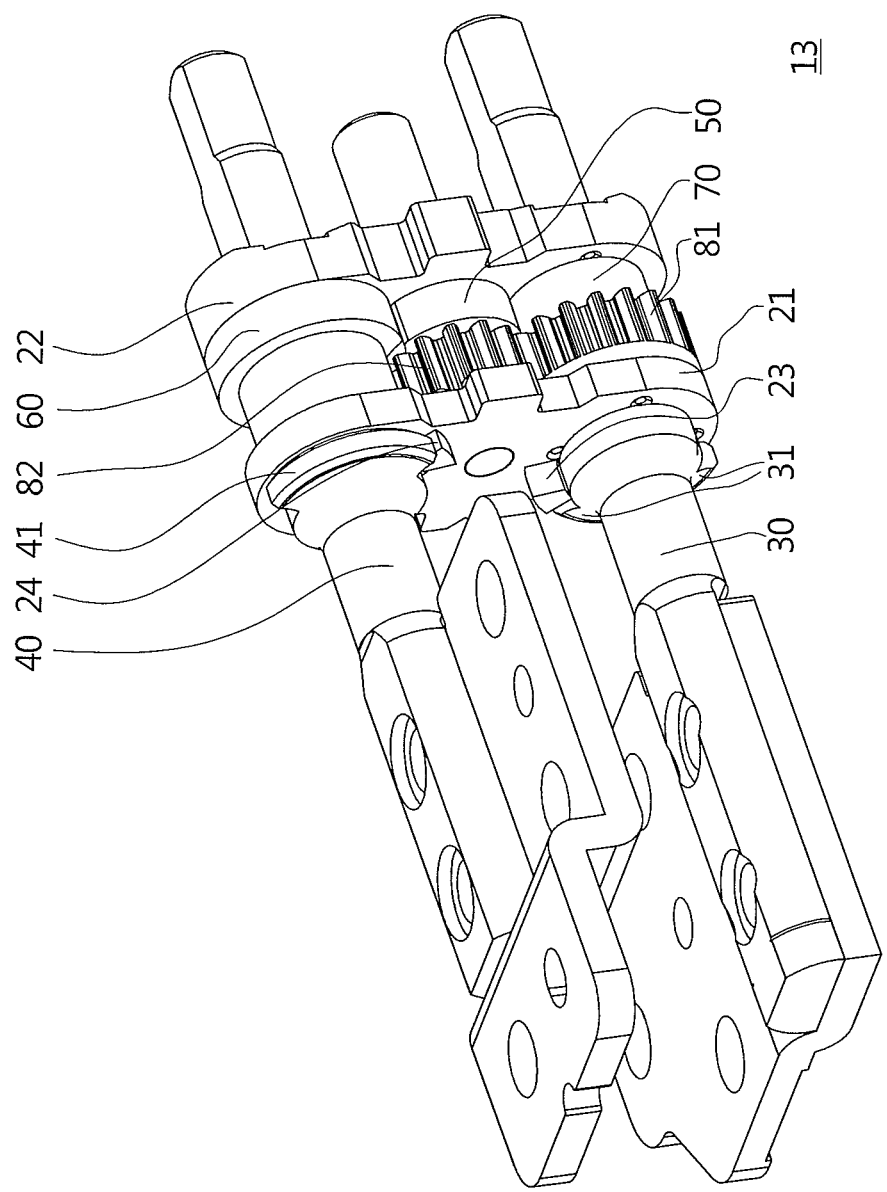
FIG. 6 is a diagram of the phase-locked pivot assembly at the 180-degree mode according to the embodiment of the present invention.

The angle between the first casing 11 and the second casing 12 can be 180 degrees, which is shown in FIG. 5. In the meanwhile, the state of the phase-locked pivot assembly 13 is shown in FIG. 6. Further, FIG. 4(b) is a top/bottom view of the state of the phase-locked pivot assembly 13. As the first casing 11 rotates relative to the second casing 12 to 180 degrees, the first shaft 30 rotates to 180 degrees at the counterclockwise direction, which is referred by FIG. 4(b). At the time, the first gear 81 and the first shaft 30 rotate to 180 degrees, the first gear 81 rotates at the counterclockwise direction, the second gear 82 and the first annular body 50 are driven to rotate to 270 degrees at the clockwise direction, and the first sunken arc portion 52 rotates to 270 degrees at the clockwise direction to face the second sunken arc portion 62.

The other end of the first constraining portion 31 is blocked by the first contacting portion 23 after the 180-degree rotation, and the first shaft 30 stops rotation at the counterclockwise direction, which is referred by FIG. 4(b). The second shaft 40 is unlocked because the second sunken arc portion 62 is not limited to the first outer annular surface 51. An end of the second constraining portion 41 is blocked by the second contacting portion 24, and the second shaft 40 only can rotate at the clockwise direction, which is referred by FIG. 4(b).

Figure 7:
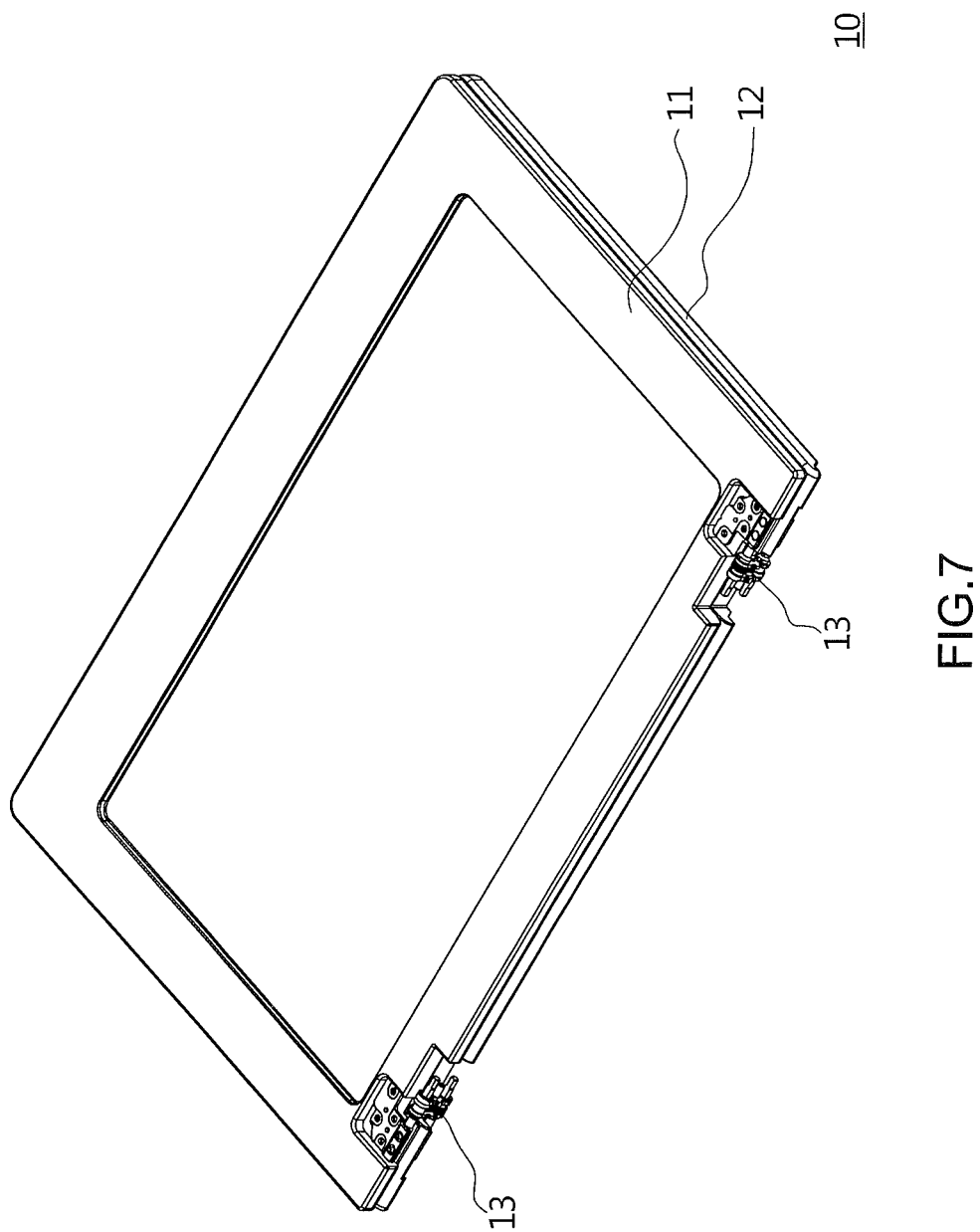
FIG. 7 is a diagram of the electronic device at a 360-degree mode according to the embodiment of the present invention.
Figure 8:
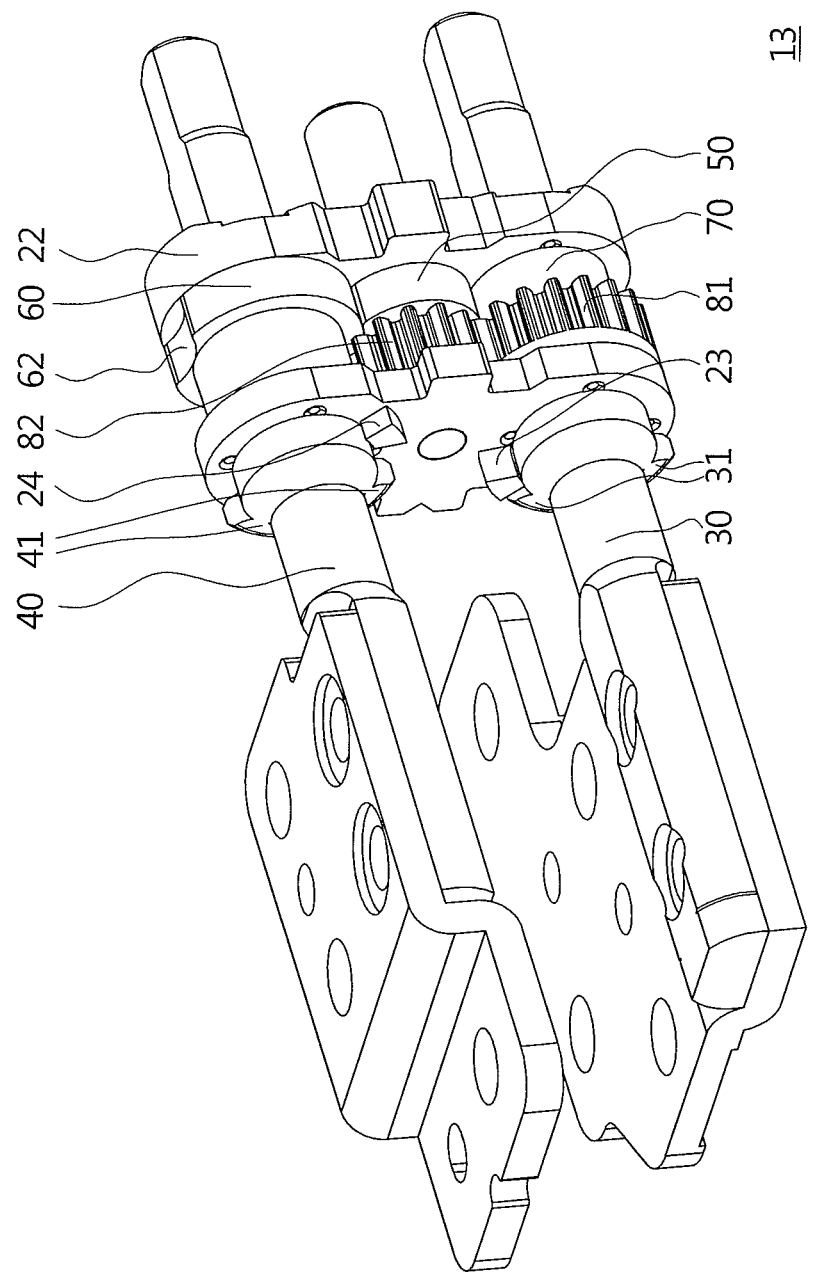
FIG. 8 is a diagram of the phase-locked pivot assembly at the 360-degree mode according to the embodiment of the present invention.

The angle between the first casing 11 and the second casing 12 can be 360 degrees, which is shown in FIG. 7. In the meanwhile, the state of the phase-locked pivot assembly 13 is shown in FIG. 8. Further, FIG. 4(c) is a top/bottom view of the state of the phase-locked pivot assembly 13. As the first casing 11 rotates relative to the second casing 12 from 180 degrees to 360 degrees, the second casing 12 rotates relative to the second casing 12 to 180 degrees, the second shaft 40 and the second annular body 60 rotate to 180 degrees, the second shaft 40 rotates at the clockwise direction, which is referred by FIG. 4(c), the second sunken arc portion 62 rotates to 180 degrees to be reverse to the first sunken arc portion 52, and the first sunken arc portion 52 contacts the second outer annular surface 61. The first sunken arc portion 52 is constrained by the second outer annular surface 61, so that the first shaft 30 is locked without rotation. Meanwhile, the second constraining portion 41 rotates to 180 degrees, the other end of the second constraining portion 41 is blocked by the second contacting portion 24, and the second shaft 40 only can rotate at the counterclockwise direction, which is referred by FIG. 4(c) without the clockwise rotation, which is referred by FIG. 4(b).

When the user intends to switch the electronic device 10 from the 360-degree mode to a zero degree mode, the second shaft 40 rotates to 180 degrees because the first shaft 30 is locked at the 360-degree mode, as shown in FIG. 4(c) to FIG. 4(b). After, the second shaft 40 is locked and the first shaft 30 rotates to the zero degree mode via 180-degree rotation, as shown in FIG. 4(b) to FIG. 4(a). The detailed illustration is the same as the above-mentioned one, and is omitted herein for simplicity.

In conclusion, the phase-locked pivot assembly of the present invention can lock the first shaft and the second shaft step by step. Comparing to the prior art, the present invention provides the phase-locked pivot assembly with advantages of fluent rotation, convenient operation and durable quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A phase-locked pivot assembly comprising:
a support component;
a first shaft and a second shaft pivoting relative to the support component respectively;
a first annular body rotatable together with the first shaft, with the first annular body comprising a first outer annular surface and a first sunken arc portion;
a second annular body rotatable together with the second shaft and corresponding to the first annular body, with the second annular body comprising a second outer annular surface and a second sunken arc portion, wherein the second annular body is disposed on the second shaft in a surrounding manner;
a first gear disposed on the first shaft in a surrounding manner; and a second gear disposed on the first annular body and engaged with the first gear, wherein an axial direction of the second gear aligns with an axial direction of the first annular body;

wherein the first sunken arc portion has a same shape as and for receiving a shape of the second outer annular surface, wherein the first sunken arc portion and the second outer annular surface selectively contact each other to lock the first shaft from rotation, wherein the second sunken arc portion has a same shape as and for receiving a shape of the first outer annular surface, and wherein the second sunken arc portion and the first outer annular surface selectively contact each other to lock the second shaft from rotation.

2. The phase-locked pivot assembly of claim 1, wherein a tooth amount of the first gear is greater than a tooth amount of the second gear.

3. The phase-locked pivot assembly of claim 1, wherein a tooth ratio of the first gear to the second gear is 1.5.

4. The phase-locked pivot assembly of claim 1, wherein the first annular body and the second gear pivot relative to the support component, and wherein the first annular body and the second gear are located between the first shaft and the second shaft.

5. The phase-locked pivot assembly of claim 1, further comprising:

a third annular body disposed on the first shaft in a surrounding manner, with the third annular body comprising a third outer annular surface, and with the third outer annular surface selectively contacting the first outer annular surface.

6. The phase-locked pivot assembly of claim 1, wherein the support component comprises a first supporting plate and a second supporting plate, and wherein the first annular body and the second annular body are located between the first supporting plate and the second supporting plate.

7. The phase-locked pivot assembly of claim 1, wherein the support component further comprises a first contacting portion and a second contacting portion, wherein the first shaft further comprises a first constraining portion corresponding to the first contacting portion, and wherein the second shaft further comprises a second constraining portion corresponding to the second contacting portion.

8. The phase-locked pivot assembly of claim 7, wherein the first constraining component is a protrusion protruding from the first shaft substantially along a radial direction of the first shaft, and wherein the second constraining component is a protrusion protruding from the second shaft substantially along a radial direction of the second shaft.

9. The phase-locked pivot assembly of claim 8, wherein the first contacting portion and the second contacting portion are protrusions protruding from the support component.

* * * * *